Oct. 3, 1944.   C. M. BELL   2,359,507
AUTOMATIC COLLET CHUCK
Filed March 29, 1943   3 Sheets-Sheet 1

INVENTOR,
CURTIS M. BELL.
BY
Chas. E. Townsend
ATTORNEY.

Oct. 3, 1944.  C. M. BELL  2,359,507
AUTOMATIC COLLET CHUCK
Filed March 29, 1943  3 Sheets-Sheet 2

INVENTOR,
CURTIS M. BELL.
BY
Chas. E. Townsend
ATTORNEY.

Oct. 3, 1944.  C. M. BELL  2,359,507
AUTOMATIC COLLET CHUCK
Filed March 29, 1943  3 Sheets-Sheet 3

INVENTOR.
CURTIS M. BELL.
BY
Chas. E. Townsend
ATTORNEY.

Patented Oct. 3, 1944

2,359,507

UNITED STATES PATENT OFFICE 2,359,507

AUTOMATIC COLLET CHUCK

Curtis M. Bell, Berkeley, Calif.

Application March 29, 1943, Serial No. 480,919½

7 Claims. (Cl. 279—53)

The present invention relates to chucks and particularly to a collet chuck which can be released or engaged without stopping the lathe. It is in the nature of an improvement over my copending application for "Automatic collet chuck," Serial Number 409,875, filed September 6, 1941.

The invention is adapted for use in conjunction with standard rotating machines, such as lathes, drill presses, milling machines, jig borers, and the like.

My chuck may be affixed to a standard type of rotating machine by screwing or otherwise affixing the spindle plate thereof to the chuck. By thus affixing my novel chuck to such a standard machine, said machine is immediately transformed into an automatic high-speed productive machine capable of continuity of high-speed production.

Objects of my invention are generally to improve and increase the speed and economy of the operation of lathes and like rotating machine; to provide an automatic collet chuck which is simple to manufacture and assemble and likewise to disassemble and repair; to provide a greater gripping leverage than has heretofore been known with the same amount of power; to provide an automatic collet chuck readily adapted for use with standard rotating machinery; and another object is to provide a simple and effective braking mechanism for use in conjunction with automatic collet chucks. Other objects and advantages will become apparent to those skilled in the art from the disclosure of my invention and the drawings and specification forming a part of the application.

Referring to the drawings in which similar characters of reference represent corresponding parts in the several views.

I have provided a device utilizing very few moving parts for the rapid release or gripping of work sought to be machined.

Figure 1:
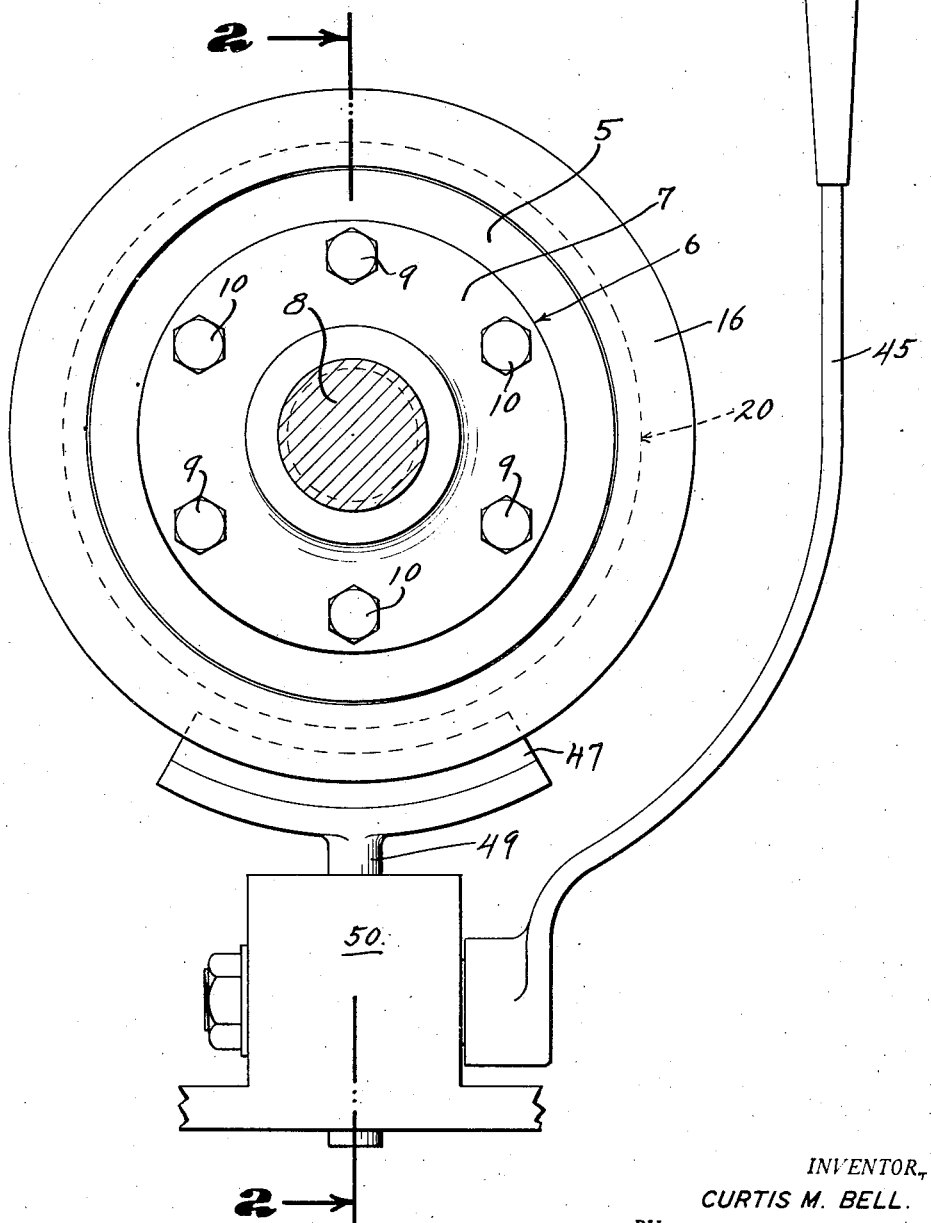
Fig. 1 is an end elevation of my invention as seen from the end opposite the collet, and showing the spindle in section.
Figure 2:
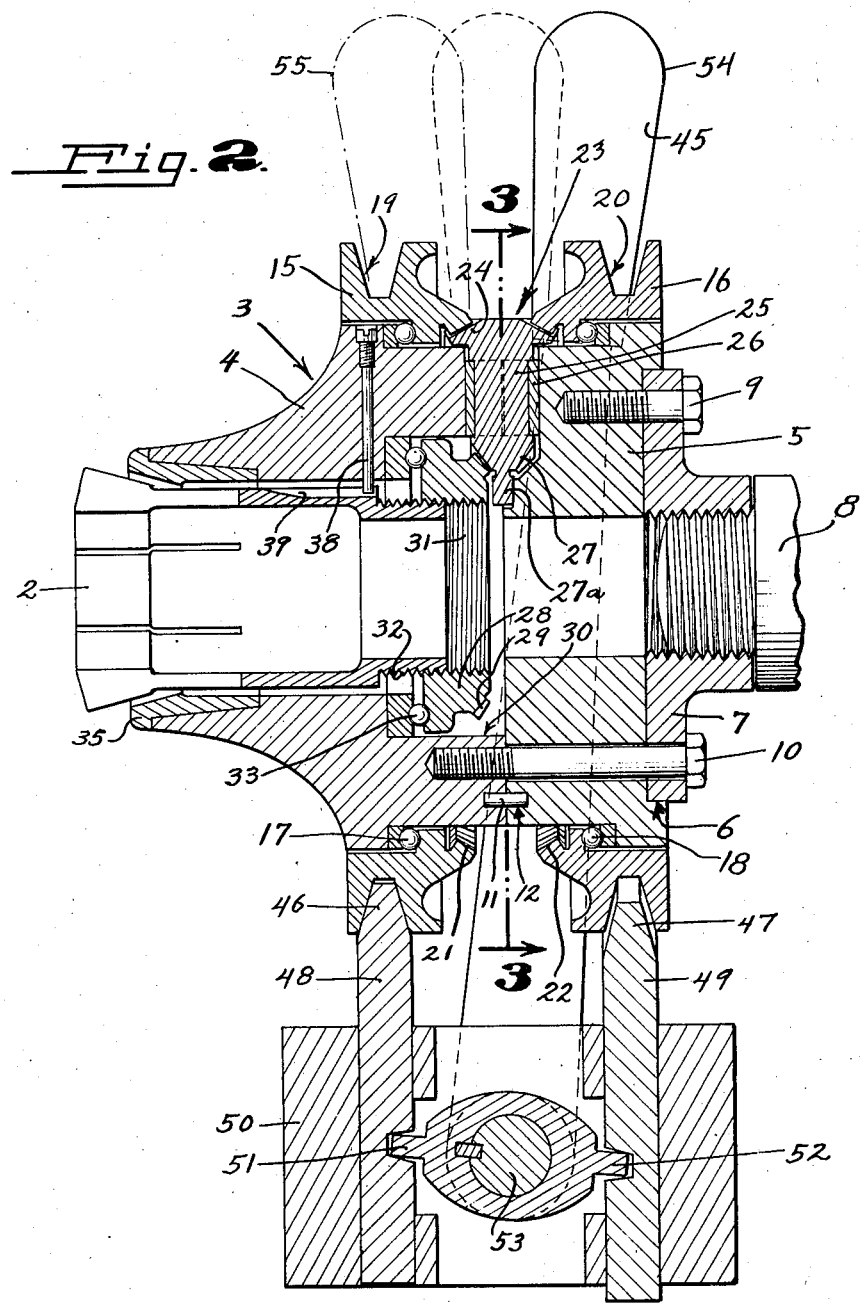
Fig. 2 is a longitudinal sectional view of my invention, taken on line 2—2 of Fig. 1, showing the collet in work-releasing position.
Figure 3:
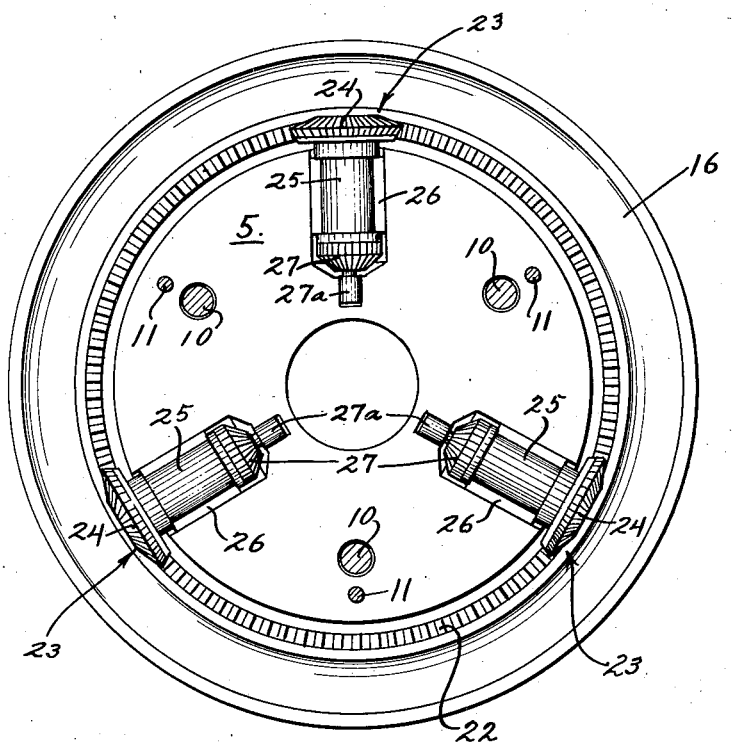
Fig. 3 is a transverse sectional view of my hub assembly, taken on line 3—3 of Fig. 2.

Fig. 2 illustrates my automatic collet chuck assembly showing a split collet 2, mounted in my chuck hub generally indicated at 3, which comprises a front tapered head 4 and rear head 5. Rear head 5 is recessed at 6 for reception of a spindle plate 7, which in turn is suitably attached to a spindle 8.

The spindle plate 7 is made fast to the rear head by means of equally spaced machine bolts 9. Front head 4, rear head 5, and spindle plate 7 are joined together by equally spaced machine bolts 10. I prefer to provide dowels 11 in aligned bores 12 provided in the two heads in order to properly and accurately align and orient the assembly.

Front head 4 and rear head 5 each carry, respectively, brake drums 15 and 16 rotatably mounted thereon and which travel respectively on ball bearing races 17 and 18. The brake drums 15 and 16 are each formed with outer peripheral notches 19 and 20 for the reception of a brake shoe as will hereinafter appear. Inner bevel gears 21 and 22 are provided in brake drums 15 and 16, respectively.

The bevel gears 21 and 22 are adapted to mesh with equally spaced bevel gear shafts generally indicated at 23. I have shown three bevel gear shafts spaced 120° from one another in balanced relation. Each of the said bevel gear shafts comprises a crown bevel gear portion 24, which meshes with the bevel gears 21 and 22, a shaft portion 25 carrying a split brass bushing 26, an inner gear portion 27 and terminal bearing 27a. Inner bevel gear 27 is adapted to mesh with draw nut 28 formed with a bevel gear 29. The said draw nut is positioned circumferentially of collet 2, in recess 30 formed in the inner portion of the front head 4 opposite the nose portion of said head. The draw nut 28 is provided with an internal thread 31 which engages right hand thread 32 formed in said collet 2. A ball bearing race 33 is provided in the said recess 30 of front head 4 so that the said draw nut 28 may rotate easily relative to said head.

The nose portion of my front head 4 is provided with a hardened steel bushing 35. It is noted that Fig. 2 illustrates the collet in distended, unlocked position.

I prefer to provide a guide pin 38 tapped in front head 4 in any suitable manner, which projects into longitudinal groove 39 formed in collet 2 in order to key the said collet properly and prevent rotation thereof relative to front head 4, but allow axial movement of the collet relative to the said head.

My braking mechanism utilizes but a single control lever 45. Brake shoes 46 and 47 are supported on brake rods 48 and 49 respectively, vertically journaled in a housing member 50 attached to the lathe bed in any suitable manner.

Levers 51 and 52 extend from control lever 45 into engagement with brake rods 48 and 49.

It is here noted that in normal working operation, all parts including the drums, bevel gear shafts, draw nut, and collet, rotate around the longitudinal axis of the assembly according to the rotation of the hub 3 driven by the spindle. It is only when one of the drums is retarded that there is a relative rotation between the parts caused by the bevel gear shafts turning on their own axes. The bevel gear shafts 28 remain idle and do not rotate on their own axes until one of the drums is retarded and then only is there a relative rotation between the parts caused by the bevel gear shafts turning on their own axes.

In operation, assuming the heads are rotated in a counterclockwise direction as driven by the spindle 8, relative rotation between the collet 2 and draw nut 28 is produced in response to braking action against the drums by means of the gearing hereinabove described. Hence, if drum 15 is retarded, bevel gear shafts 23 will no longer simply be idle but will rotate on their own axes in a clockwise direction by meshing with the teeth of the said retarded drum and hence will drive draw nut gear 28 in the opposite or clockwise direction relative to the rotating, hub, spindle, and collet and hence screw up on the right hand thread formed in collet 2 and cause gripping of the work stock. Conversely, if drum 16 is retarded, draw nut gear 28 will be driven in a clockwise direction, hence causing the draw nut 28 to unscrew from right hand threaded collet 2 and release the work.

Referring to the braking action, if lever 45 is rocked on its pivotal mounting 53 to the right, as shown in full line position 54, rod 48 will force brake shoe 46 into the notch 19 and into engagement with drum 15 causing the collet to grip work therein. If the lever 45 is moved to the right, as shown in dotted position 55, rod 49 will force shoe 47 against drum 16 and thereby cause the collet to release work therein.

It is obvious that other braking mechanisms may be utilized than that described specifically herein.

While the invention has been illustrated and described in certain detail of embodiment for illustrative purposes, it is not intended that the invention be limited thereto but that modifications and changes in details of construction may be incorporated within the spirit and scope of the appended claims.

I claim:

1. An automatic collet chuck adapted for connection to a standard rotating machine such as a lathe and operable to selectively release or engage work stock during rotation of said rotating machine, comprising a hub for attachment to a spindle, a collet fixed non-rotatively in said hub and movable axially thereof to grip and release stock, separately movable brake drums mounted about, and rotatable relative to, said hub, differential gearing within said hub actuated by relative rotation of said drums to traverse said collet axially of said hub, said differential gearing including a plurality of spaced bevel gear shafts mounted for free rotation and positioned to mesh with said brake drum and a toothed draw nut threadably engaged with said collet, and means for retarding said drums selectively.

2. An automatic collet chuck adapted for connection to a standard rotating machine such as a lathe and operable to selectively release or engage work stock during rotation of said rotating machine, comprising a two-part hub arranged for attachment to a head spindle, a non-rotatable collet axially movable within said hub for releasing and gripping stock to be machined, brake drums rotatably mounted on said hub and rotatable with respect to one another and said hub, bevel gear shafts positioned between the said two parts of said hub, said bevel gear shafts mounted for free rotation and positioned to mesh with said brake drums and a draw nut threadably engaged with said collet.

3. An automatic collet chuck adapted for connection to a standard rotating machine such as a lathe and operable to selectively release or engage work stock during rotation of said rotating machine, comprising a hub for attachment to a spindle, a collet fixed non-rotatively in said hub and movable axially thereof to grip and release stock, separately movable brake drums mounted about, and rotatable relative to, said hub, differential gearing within said hub actuated by relative rotation of said drums to traverse said collet axially of said hub, said differential gearing including a plurality of freely rotatable spaced bevel gear shafts positioned to mesh with said brake drums and a toothed draw nut threadably engaged with said collet, brake means selectively operable against said drums comprising a mounting member, brake rods slidably disposed in said mounting member, brake shoes fixed to said rods, a control lever, and means for moving said rods by said handle to engage said shoes alternatively with said drums.

4. An automatic collet chuck adapted for connection to a standard rotating machine such as a lathe and operable to selectively release or engage work stock during rotation of said rotating machine, comprising a two-part hub arranged for attachment to a head spindle, a non-rotatable collet axially movable within said hub for releasing and gripping stock to be machined, brake drums rotatably mounted on said hub and rotatable with respect to one another and said hub, bevel gear shafts positioned for free rotation between the said two parts of said hub, said bevel gears shafts mounted for free rotation and positioned to mesh with said brake drums and a draw nut threadably engaged with said collet, brake means selectively operable against said drums comprising a mounting member, brake rods slidably disposed in said mounting member, brake shoes fixed to said rods, a control lever, and means for moving said rods by said handle to engage said shoes alternatively with said drums.

5. An automatic collet chuck adapted for connection to a standard rotating machine such as a lathe and operable to selectively release or engage work stock during rotation of said rotating machine, comprising a two-part hub arranged for attachment to a head spindle, a non-rotatable collet axially movable within said hub for releasing and gripping stock to be machined, a pair of internally toothed brake drums mounted for free rotation on said hub, bevel gear shafts mounted for free rotation and positioned between said hub portions and comprising a crown bevel gear portion, shaft portion, and inner bevel gear portion, and an exteriorly toothed draw nut threadably engaged with said collet, said crown bevel gear portion arranged to mesh with said toothed brake drums, said inner bevel gear portion arranged to mesh with said toothed draw nut.

6. An automatic collet chuck adapted for connection to a standard rotating machine such as a lathe and operable to selectively release or engage work stock during rotation of said rotating machine, comprising a two-part hub arranged for attachment to a head spindle, a non-rotatable collet axially movable within said hub for releasing and gripping stock to be machined, a pair of internally toothed brake drums mounted for free rotation on said hub, bevel gear shafts mounted for free rotation and positioned between said hub portions and comprising a crown bevel gear portion, shaft portion, and inner bevel gear portion, an exteriorly toothed draw nut threadably engaged with said collet, said crown bevel gear portion arranged to mesh with said toothed brake drums, said inner bevel gear portion arranged to mesh with said toothed draw nut, and braking means adapted to selectively retard a brake drum, said braking mechanism utilizing but a single control lever.

7. An automatic collet chuck adapted for connection to a standard rotating machine such as a lathe and operable to selectively release or engage work stock during rotation of said rotating machine, comprising a hub member arranged for attachment to a spindle, a collet axially movable within said hub for releasing and gripping stock to be machined, brake drums mounted for free rotation on said hub, means to impart relative rotation between said collet and a draw nut threadably engaged therewith including differential gearing arranged to mesh with said brake drums and said draw nut, said means operable during rotation of said hub, and means to selectively retard one of said drums.

CURTIS M. BELL.